March 3, 1970  D. F. STANFILL III  3,499,153
NONDESTRUCTIVE TESTING OF MATERIALS BY INFRARED RADIATION
Filed Jan. 9, 1967  3 Sheets-Sheet 1

INVENTOR.
DANIEL F. STANFILL III
BY
Robert Ames Shaton
ATTORNEY

INVENTOR.
DANIEL F. STANFILL III
BY
ATTORNEY

March 3, 1970 D. F. STANFILL III 3,499,153
NONDESTRUCTIVE TESTING OF MATERIALS BY INFRARED RADIATION
Filed Jan. 9, 1967 3 Sheets-Sheet 3

INVENTOR.
DANIEL F. STANFILL III
BY
Robert Cimer Norton
ATTORNEY

United States Patent Office 3,499,153
Patented Mar. 3, 1970

3,499,153
NONDESTRUCTIVE TESTING OF MATERIALS
BY INFRARED RADIATION
Daniel F. Stanfill III, Stamford, Conn., assignor to Barnes
Engineering Company, Stamford, Conn., a corporation
of Delaware
Filed Jan. 9, 1967, Ser. No. 608,075
Int. Cl. G01t 1/16
U.S. Cl. 250—83.3                                    15 Claims

ABSTRACT OF THE DISCLOSURE

Method and apparatus for determining flaws in the surface of articles such as metals and metal alloys by measuring the infrared radiance of objects maintained at a substantially constant temperature above ambient, or by measuring the reflectance of infrared radiation from the surface of a material to be tested which is at a temperature sufficiently below that of the source of infrared radiation that its emission is negligible by comparison. Defects or changes in composition change the emissivity of the surface of the material tested, and this in turn changes its self-emission when maintained at an elevated temperature, or its reflectance when maintained at a lower temperature and irradiated with infrared radiation. Measurement of the emitted or reflected radiation may be by an infrared radiometer which chops the received infrared beam but is preferably a radiometer which does not chop the beam. In the latter case the radiometer has a radiation detector and amplifying circuits with differentiating inputs of suitable time constant so that D.C. level of radiation or very slow changes are not amplified. Usually, the surface of the material to be tested is moved with respect to the field of view of the radiometer to scan the surface. Defects or composition changes record as sharp peaks or valleys on a suitable strip recorder.

BACKGROUND OF THE INVENTION

The field of the invention is in the nondestructive testing of materials for flaws or nonuniformities in their surface by means of infrared radiation emitted or reflected from the surface.

In the prior art infrared radiation has been used for measuring temperature of materials by their self-emission. Changing emissivity of the suface has created a problem, as it can lead to a variation of infrared radiation without a change in temperature. In other words, if there is changing emissivity, this can be interpreted by the measuring instrument as a change in temperature, which is a false and spurious result. It has been attempted in the past to compensate partially for emissivity changes, for example by an auxiliary infrared radiation equal in intensity to radiation from the material at its particular temperature if the material were a black body with an emissivity of 1. This is the method used, for example, in the patent to Muenker, No. 2,886,970. It eliminates the effect of emissivity changes if, and only if, the instrument is calibrated so that the auxiliary infrared source is equal in intensity to the emission of a black body at the particular temperature of the material.

Another proposed procedure is to heat the material locally at a point removed from the field of view of the measuring infrared radiometer. The material then moves until, after a short time delay, the localized area heated comes into the field of view of the infrared radiometer. Measurements to detect flaws or non-uniformities in the material depend on the fact that a thermal gradient is produced from the locally heated spot and that flaws or non-uniformities have different thermal conductivities than the material itself. This type of flaw detector is typified by the Muaro Patent No. 3,206,603.

SUMMARY OF THE INVENTION

The present invention detects flaws or inhomogeneities in the *surface* of the material to be tested by maintaining the material at a substantially uniform temperature, either largely above ambient, or at a much lower temperature than a source of radiation striking the area on the surface of the material which is in the field of view of the radiometer. Measurement is based on the principle that a non-uniformity, flaw, or other undesired variation from the uniform surface of the material has been found to result in a change of emissivity. If the emissivity increases, as it usually does in metal alloys, there will be an increase in emission at the same temperature if measurement is by the emission of the test material maintained at a temperature considerably above ambient, or a decrease in the radiation if the measurement is by a reflected infrared beam.

As the material is scanned by the radiometer, due to relative movement of the material and the field of view of the radiometer, the surface non-uniformities are detected. By suitable electronic circuits in the infrared radiometer and suitable recorders, such as a strip recorder, or an alarm system triggered by the electrical signal exceeding preset limits, it is possible to detect any non-uniformity or defect which appears at the surface of the material being tested.

The general nature of these elements will be described in more detail below. It should, however, be pointed out that the present invention operates by reason of a change in emissivity of the surface. It is in no sense concerned with the extent or nature of thermal gradients produced. The principle, therefore, is entirely different from the measurements by thermal gradient which has been referred to above in the prior art, and which can detect only non-uniformities which are sufficiently extensive throughout the material. Thermal gradient measurements, of course, cannot measure at all a non-uniformity that is on the surface and does not extend into the material. By the same token, the present invention, which operates on a different principle, namely change of emissivity, can measure and locate surface non-uniformities whether or not they extend into the body of the material being tested, but cannot locate a nonuniformity which is in the material tested but does not extend to or appear on the surface.

The thermal gradient method not only is incapable of measuring surface defects or nonuniformities that do not penetrate into the body, but it is affected by the shape or orientation of a flaw in the body of the material. The thermal gradient method produces isotherms which are moved or changed in the shadow of the defect. The principle is analogous to the formation of flow lines in a fluid when a body moves through it. These flow lines are usually distorted, but if the body is thin, perfectly streamlined, and parallel to the lines of flow, it cannot be detected, and the same is true with the thermal flow lines in the thermal gradient method. An example of a type of flaw which is not detectable by the thermal gradient method is a crack perpendicular to the isotherms. Heat flow along the crack, of course, is not detectable, and heat flow across the crack, which it produces a change in temperature due to the sharp change in thermal impedance, will register most effectively only when the crack is parallel to the isotherms. The present invention, operating on an entirely different principle, namely variations of emissivity on the surface due to a defect or non-uniformity, is completely unaffected by the extent to which the defect penetrates into the material, and its particular shape, or orientation.

The thermal gradient flaw detection requires a uniform application of heat to a local portion of the material being tested, and variations in the movement of the material to be tested produce variations in the measurement. In the present invention, where the operating principle is by emissivity changes, the characteristic which has been considered a drawback and source of spurious results in infrared temperature measurements is used to advantage. The emissivity method of detection is not concerned with a constant heating, so long as there is sufficient temperature of the material tested to be high enough above ambient to avoid spurious responses. The detection is just as accurate even if the temperature of one piece of material tested varies widely from that of another. Similarly, in the reflectance modification, it does not make any difference what the temperature of the material is, so long as it is sufficiently low that its self-emission does not blur the response. For example, in the reflectance method, if a temperature around ambient is sufficiently low, exactly the same results are obtained if a material were tested at liquid nitrogen temperature of 77° K. Provided that the surface is maintained uniformly frost-free in a dry gas atmosphere or in a vacuum, large extremes in temperature do not adversely affect detection by the procedure of the present invention. Such wide temperature extremes would make the measurements incompatible with any procedure using thermal gradients. This insensitiveness is an advantage of the invention, and also shows clearly that the present invention is operating under a different physical principle from the thermal gradient measurements, and is using a characteristic, namely emissivity change, which is normally considered a drawback to infrared measurement, and which otherwise must be eliminated by elaborate balancing out or other procedures.

Reference has been made above the radiometer used for detecting the infrared radiation may chop the beam, or it may operate with an unchopped beam. In the latter case, however, the electronic circuits must involve differentiation, that is to say they must not respond to absolute raidation level or to a relatively slow change, which is significantly slower, for example, than the chopping rate in the case of this modification. This is quite unusual in radiometers operating with an unchopped beam. Normally the electronics of such radiometers must provide for D.C. amplification. The present invention requires as an essential that they have differentiating inputs.

When the chopped-radiation radiometer is used, which is similar or, for all practical purposes, identical with the radiometers used in thermal-gradient measurements, there are certain limitations on the speed with which the surface of the material being tested is scanned. It must be substantially slower than the movement of surface corresponding to one chopping cycle. Otherwise a small defect may not be accurately detected. The same limitation on scanning speed of course applies to the thermal-gradient methods which use chopping radiometers.

Unchopped operation in the present invention, however, has no limit except the time constant of the radiation detector, and it has a very important additional advantage that it also eliminates certain conditions which result in apparent slow emissivity changes which are not real. If the surface of the material being tested is not flat, for example if it had a raised portion, for example a fillet in a round disc or other structure, such as a turbine blade, which is one of the most important practical fields of utility of the present invention, as the radiometer is scanned slowly across such a raised portion, for example in a spiral scan, there will be a change in emissivity even though the emissivity of any element of the surface is absolutely constant. The reason for this is that as the scan climbs up the edge of such an area, the radiation is different from a given small field of view than if the surface at that point were at right angles to the radiation going to the radiometer. This would be interpreted as an apparent change in emissivity, and with practical chopping and scanning speed, would give a false indication of a defect or non-uniformity. Of course exactly the same phenomenon will give a false indication in the thermal-gradient type of measurement which uses a chopped beam radiometer. If, however, the radiometer is unchopped, the amplifier circuits are provided with sufficient differentiation that the comparatively slow change as the spiral scan moves up the slope of a protuberance, does not cause the amplifier to respond. In other words, the amplifier, and hence, of course, the whole radiometer, is blind to such changes, and a true defect, flaw, or nonuniformity in the surface is detected without spurious responses. For this reason the unchopped modification is capable of precise and unambiguous flaw detection under conditions where the chopped modification could give a false indication. It is therefore preferred.

While radiometers which chop the incoming beam are not preferred, this does not mean that accurate results are not obtainable by the reflectance modification if the source of infrared radiation is chopped, although the beam is not chopped in the radiometer. This modification is actually in some cases more accurate because spurious radiation changes with long time constants are not detected.

Reference has been made to the fact that the present invention does not operate by measuring the temperature variation in a sample, as does the thermal-gradient method, and that all that is required is that the material tested have either a constant temperature or at least that the temperature does not change so rapidly over local areas that the radiometer responds to it. There may be considerable change but if it is slow enough it will not be detected in the unchopped modification. Thus for example, it is not necessary to maintain a constant temperature in the material during the test. It could be heated up, if the self-emission method is used, and even if it cooled down perceptibly during the measurement, which may be a matter of minutes where the surface is large, there is no effect with the unchopped beam modification, because the cooling down is quite slow, orders of magnitude slower than the time constants of the differentiating circuits in the amplifier. It will be apparent that this permits large savings in operation, because precise temperature control becomes unnecessary, and this is an additional practical advantage of the preferred modification.

The present invention is useful for detecting surface flaws in any material in which the flaw results in a sufficiently marked change of emissivity. This may result from various causes, for example in an alloy, such as a titanium alloy for jet engine wheels and blades in the turbine and compressor, the most important single field at present for the present invention, local changes in alloy composition change the emissivity. This is usually referred to as segregation; for example there may be spots of pure titanium, or other areas having an excess of the alloying elements, such as aluminum or vanadium, or there may be oxygen held in solid solution in interstitial grain boundaries (alpha segregation), or there may be a difference in crystal structure. For example, titanium may occur either as a hexagonal grain structure or a face-centered cubic structure, depending on heat-treating temperatures and subsequent cooling schedules. Whenever there is a significant change, this may result in a local area of undesired characteristics. Such a defect is often referred to as a primary alpha segregation.

Another important field is in the examination of welds. Even when the weld is performed in a controlled or relatively inert atmosphere, there may be undesirable absorption of gases or other nonuniformity. These nonuniformities represent weaknesses, and can be detected by the present invention. A typical example of this modification of the invention is presented by welds in the titanium skin of supersonic airplanes. These welds, when made in an inert atmosphere, have a smooth, shiny appearance more like a braze than a weld, and are usually ground flat. The weld itself may well have an emissivity which is different from adjacent parts, but if scanning is along the weld, and particularly if an unchopped radiometer is used, defects due to gas inclusion or other non-uniformity will show up.

Theoretically it is possible to measure welds either by self-emission with the material sufficiently hotter than the ambient temperature, or by reflection where the material is cooler. In the case of airplane skins, which is one of the most important uses, it is generally not practical to heat up a whole airplane wing or a major portion thereof; therefore for such use the reflectance modification of defect detention is preferable.

Another problem is sometimes presented by changes in surface roughness, which of course change emissivity. It is rare to have changes in roughness occur suddenly in very small areas; the change is generally more gradual and of course is not an interfering factor in the unchopped modification because the amplifiers do not see such a slow change.

The present invention has many advantages over methods which involve spectral selectivity. Since changes in emissivity extend through a broad band of the infrared, a broad-band instrument may be used which is both cheaper and which provides more energy and hence the measurements have a greater signal-to-noise ratio. This is an advantage for of course there is always some random noise in any infrared instrument and of course there is repeatable background radiation from the surface. Without intending to limit the invention, the possibility of using a broad band of infrared radiation makes an economical and simple radiometer practical which uses germanium optics and therefore operates in the germanium-transmittal band of infrared radiation, of $1.8\mu$ to about $22\mu$.

Reference has been made to relative motion of material to be tested and field of view of the radiometer, which produces in effect a scan of the radiometer's field of view over the surface of the material. It is a matter of complete indifference whether this relative motion is produced by a stationary radiometer and a moving test object, a stationary test object and a moving radiometer, or where both motions occur. All that is necessary is that there be relative motion.

Because the surface of the test material does not have to be at an absolutely uniform temperature so long as there are no temperature changes sufficiently sudden and localized to affect the differentiating input to the amplifiers from the radiation detectors, the term "substantially uniform temperature" will be used in a sense that there are no variations fast enough to produce signal changes that are amplified above noise level.

The operation of the present invention requires that a defect should both extend to the surface of the material examined and that a defect or inhomogeneity shall result in a change in emissivity. Wherever this takes place the present invention can be used, and therefore it is not necessarily limited to any particular materials, so long as the material has the properties, in the case of defects, set out above. Copper and copper alloys, both of which materials exhibit the characteristics of large change in emissivity where gas absorption occurs, are examples of materials susceptible to local defects. These types of metals, particularly titanium, constitute the most important materials for testing in the present invention. In a more specific aspect of the invention, its use with these materials will be described and claimed.

DESCRIPTION OF THE PREFERRED EMBODIMENTS

Figure 1:
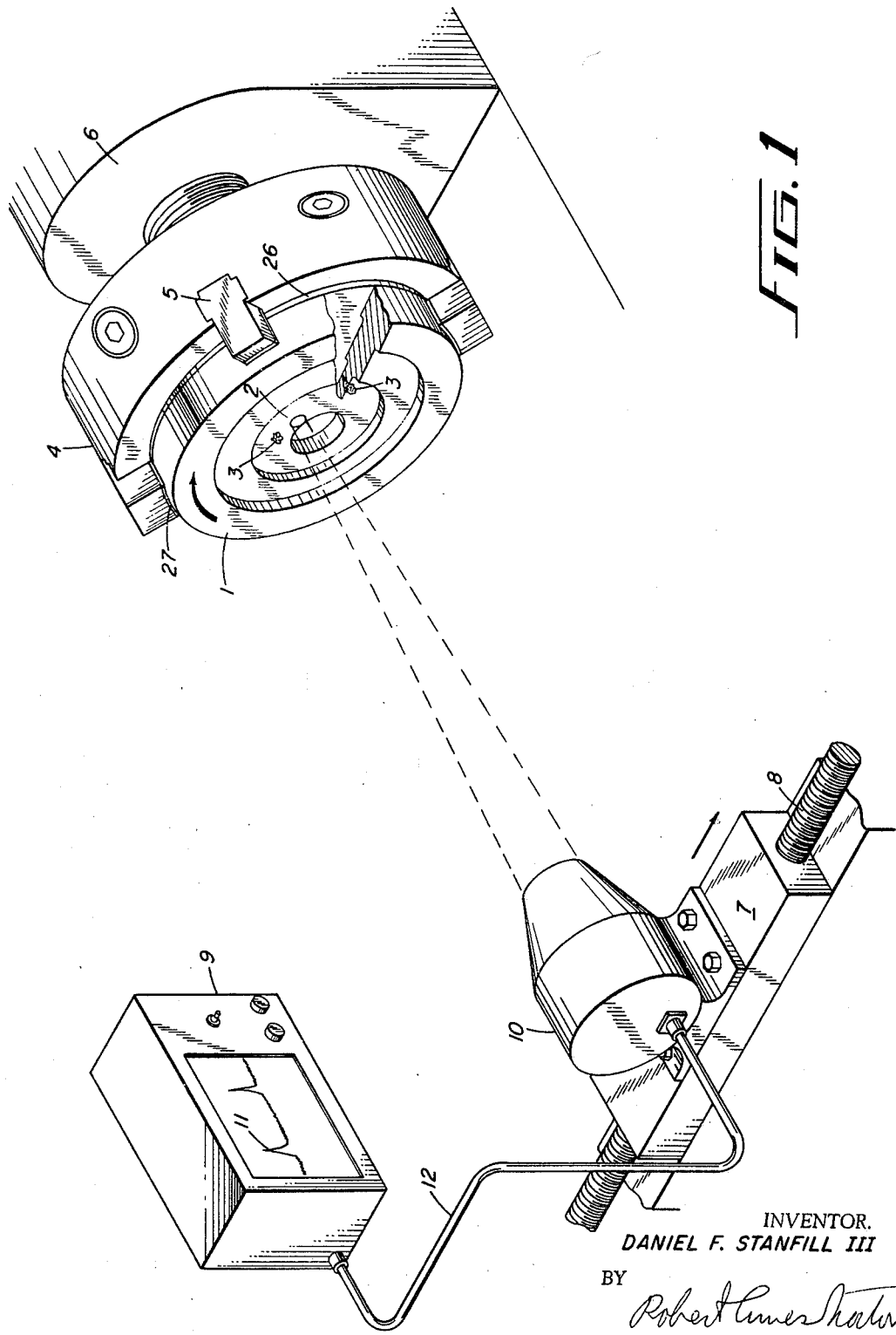
FIG. 1 is an isometric view of testing a turbine wheel blank by the self-emission modification.

In FIG. 1 a turbine blank or wheel 1 with fillets, only one level of which is shown at 2, is tested. The blank is shown with two defects 3, one of which is shown only on the surface, and the other at a point where the blank is broken away, showing the defect extending through the body of the blank. The blank is held in a lathe chuck 4 provided with dogs 5, the whole being driven from the headstock 6 of the lathe. Insulation 26 is shown between the blank 1 and the chuck, and insulation 27 between the dogs and the periphery of the blank. This insulation is provided because in the modification illustrated in FIG. 1 the disc is heated up considerably above ambient, for example 100° above, and while cooling during the test does not interfere, it is desirable that the cooling not be too rapid or too localized.

A radiometer 10 is mounted on the lathe tool holder 7, which is moved across the axis of the lathe by the traverse screw 8. The radiometer is focused onto a spot on the blank shown by the dashed lines defining the radiometer's field of view. The lathe is started, and as the chuck 4 turns, the carriage 7 is slowly moved by the conventional interconnection of screw 8 with the main lathe drive. As this is a conventional device, the specific details are not shown in the drawing. A spiral scan results, and the radiometer, which is of the unchopped type, is provided with a differentiating circuit and amplifier.

Figure 2:
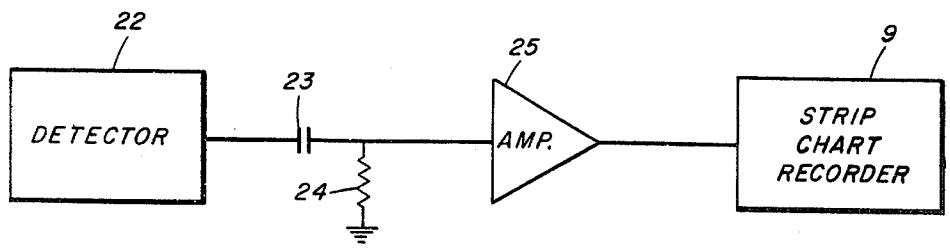
FIG. 2 is a block schematic of the electrical circuits.

The circuit diagram in FIG. 2 shows the detector of the radiometer as a block 22 with a capacitor 23 and resistance to ground 24 constituting a differentiating circuit, and feeding into the input of the amplifier 25. The output goes to a strip recorder 9 which is also shown on FIG. 1 connected to the radiometer through the cable 12.

As the lathe turns, the field of view of the radiometer is scanned around the blank in a spiral. When it crosses the defects 3 in the blank which, for example, is a titanium alloy, there will be an increase in emissivity, and so there will be recorded spikes or peaks 11 on the strip recorder 9. These peaks are well above the random noise and background noise which is shown diagrammatically on the recorder as a wavy base line. It will be noted that when the scan slowly mounts a fiillet or change in level on the blank, this is far too slow to pass through the differentiating circuit, and therefore will not appear as a false indication on the strip recorder.

Figure 3:
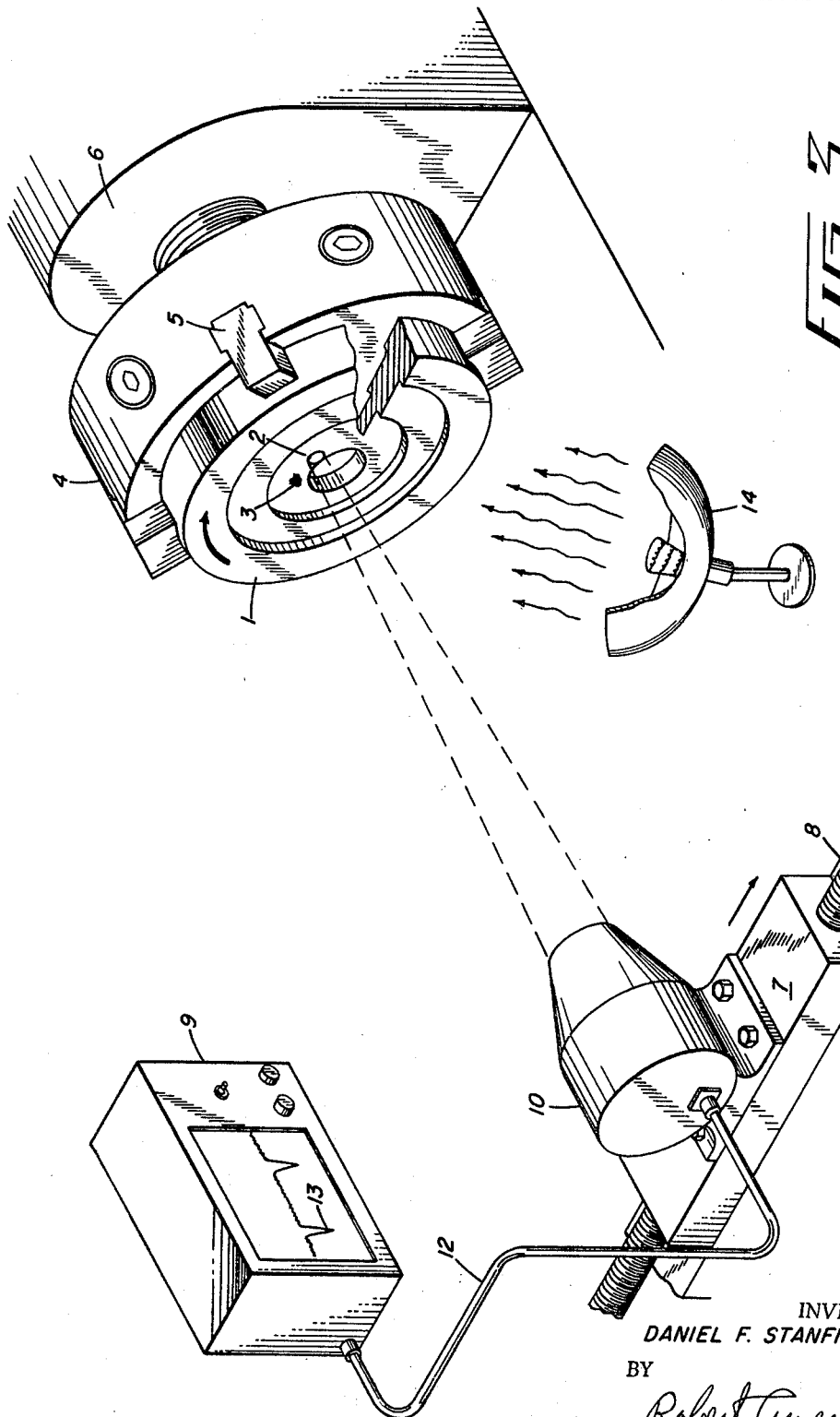
FIG. 3 is an isometric view similar to FIG. 1 of testing by the reflection methods.

FIG. 3 is similar to FIG. 1, with the same elements bearing the same reference numerals, but instead of having the blank at a temperature sufficiently above ambient so that it is self-emitting in the infrared with adequate energy, the blank is cold. It may be at ambient temperature or, if desired, may even be cooled before being placed in the headstock of the lathe. The surface of the blank is irradiated with infrared radiation from a typical infrared radiator 14, and the radiation is reflected back into the radiometer 10. Rotation of the lathe headstock and traversing of the carriage 7, which is effected in the same manner as in FIG. 1, results in spiral scanning the field of view of the radiometer across the blank, and the radiometer responds therefore to reflected infrared radiation. The same circuitry is used as in FIG. 1, and therefore there is no response in the strip recorder 9 unless there is a localized point on the surface where a defect 3 occurs, and the emissivity is different. As pointed out in connection with the description of FIG. 1, if the blank is a titanium alloy the defect will show a localized area of higher emissivity, and hence, of course, lower reflectivity. Therefore, the signals from a defect appear on the strip recorder 9 as valleys 13 instead of peaks 11 as in the modification described in FIG. 1. The operation is otherwise the same.

Figure 4:
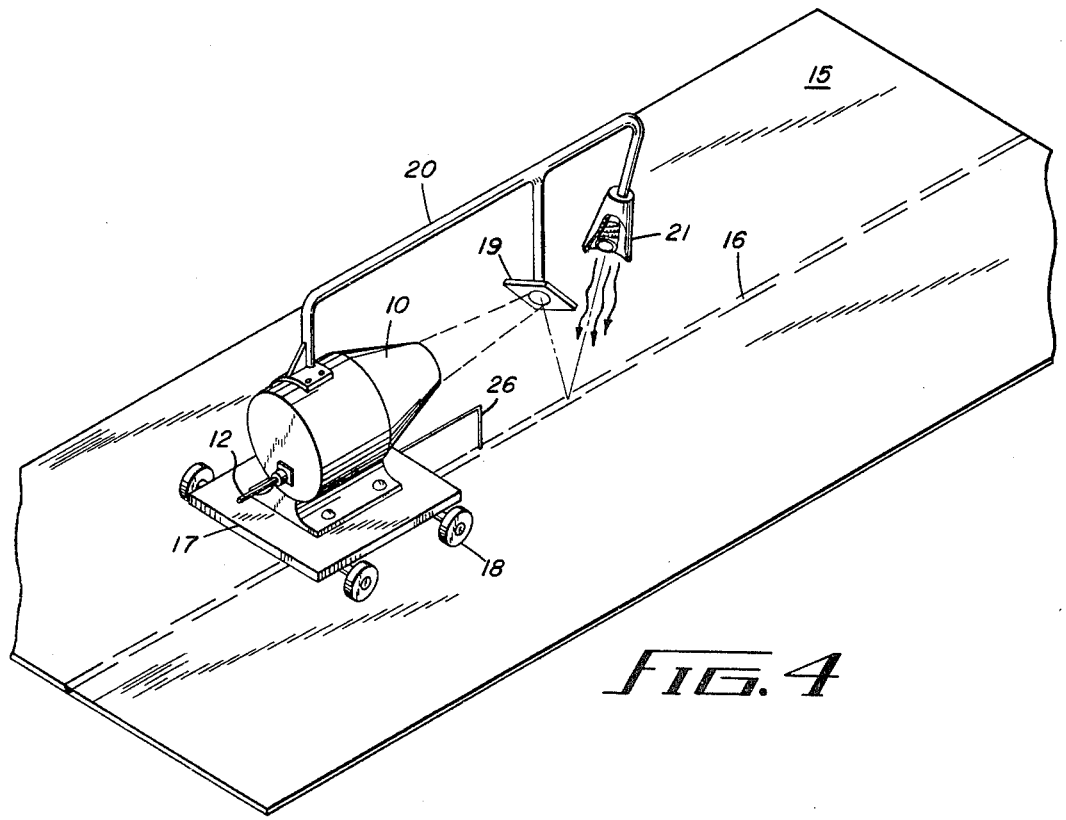
FIG. 4 is an isometric view of a modification for testing welds.

The present invention is also useful for examining welds for defects, such as gas pockets and other inhomogeneities. This is shown in FIG. 4, in which the radiometer and its output cable 12 bear the same reference numerals as in FIG. 1. A sheet of titanium 15, such as for example a portion of the skin of the wing of a supersonic airplane, includes a weld 16 which, in accordance with standard practice, is smoothed down and therefore is shown as occurring in the material by means of dashed phantom lines.

The radiometer 10 is mounted on a carriage 17 with wheels 18, and of course is connected to a display source such as a strip recorder through its output cable 12. The electrical circuitry in the radiometer is the same as in FIGS. 1 and 3, and is illustrated in FIG. 2. The cable 12 is, of course, longer, as it has to permit a greater distance of movement of the carriage 17.

In operation, the titanium wing surface is maintained at a reasonably constant temperature, for example ambient or other sufficiently low temperature. The carriage is moved along the weld either by the operator manually, or by a conventional automatic means, which are not shown. A pointer 26 permits the operator to guide the carriage along the weld when the manual modification is used.

On the radiometer there is mounted a tubular arm 20 carrying an infrared radiator 21 and a reflecting mirror 19. As will be seen, when the carriage moves along the weld, successive portions are irradiated by infrared radiations from the source 21, and these radiations are reflected into the radiometer by the mirror 19, as is shown by the dashed lines enclosing the infrared beam thereto, in a similar manner as is illustrated in FIGS. 1 and 3. As the ground-down weld will usually be shiny, it will usually have lower emissivity or higher reflectivity than the titanium sheet itself, and so when it reflects infrared radiation from the source 21, defects in the weld will show up as areas of higher emissivity and hence lower reflectivity. As a result the recorder will show a record of defects which is similar to that shown in FIG. 3 rather than that in FIG. 1.

As the carriage is moving along the weld, its position can be determined by the pointer 26. It is not essential that there be a continuous strip recorder, although this can be used. For example, if the carriage is moved along manually, an ordinary meter can alert the operator to a point where a defect has increased the emissivity and lowered the reflectivity, thus causing a much lower reading on the meter. The pointer 26 locates the general position of the field of view of the radiometer, and so the position of the defect can be noted and marked on the sheet by paint or other marking means. It is not necessary that the pointer 26 point exactly to the middle of the spot represented by the field of view of the radiometer. It is sufficient if it is at a known small distance from it, and is so shown in FIG. 4 in order to make the drawing clearer.

If it is desired to obtain the maximum accuracy in detecting the size of defects, a uniform rate of travel of the carriage along the weld is needed. This can be effected by any conventional automatic means. No such means are shown in FIG. 4, as they would only confuse the drawing, and the particular design of automatic travel forms no part of the present invention. For many operations the simpler and more flexible manual movement of the radiometer carriage gives ample precision. It is an advantage of this modification of the invention that the best method of moving the carriage uniformly along the weld may be chosen in the light of the various conditions presented by the particular operation.

I claim:

1. An apparatus for detection of faults on the surface of an object having rotary symmetry, the material of which shows a difference in emissivity at the surface where a defect occurs, comprising, in combination, (a) a lathe-like mechanism comprising a headstock and a transverse carriage at right angles to the axis of the headstock;
   (b) clamping means associated with the headstock adapted to hold the object being tested and means for revolving the headstock with the clamping means about an axis, and synchronously driven means for traversing the carriage at right angles to the axis of revolution of the headstock;
   (c) an infrared radiometer provided with an amplifier having a differentiating circuit in its input, the radiometer being mounted on the carriage with its field of view focused as a spot on the surface of the object being rotated, whereby rotation of the headstock and traversing of the radiometer-carrying carriage produces a spiral scan of the radiometer field of view around the object being tested; and
   (d) indicating means responsive to the signals from the amplifier and hence to signals produced by a rate of change of infrared radiance as the field of view of the radiometer is scanned over a defect, the rate of change being sufficient to produce signals of a frequency passing through the differentiating circuit of the amplifier.

2. An apparatus according to claim 1 comprising insulation means between the headstock and its clamping means, and the object being held, whereby when preheated objects are scanned, the cooling during a spiral scan is slow, the radiometer amplifier having a differentiating circuit having a time constant sufficiently short so that changes in radiation resulting from cooling of the object are not amplified by the amplifier.

3. An apparatus according to claim 1 comprising, in addition, means for illuminating the surface of the material tested with infrared radiation sufficiently intense to produce response in the radiometer sufficiently high to be substantially unaffected by self-radiation from the object being tested.

4. An apparatus according to claim 3 for testing for defects of an object having rotary symmetry in which there is provided a lathe-like mechanism comprising a headstock, clamping means adapted to hold the object being tested, means for revolving the headstock about an axis, synchronously driven means for traversing a carriage at right angles to the axis of revolution of the headstock, the radiometer being mounted on said carriage with its field of view focused as a spot on the surface of the object being rotated, whereby rotation of the headstock and traversing of the radiometer-carrying carriage produces a spiral scan.

5. An apparatus according to claim 1 in which radiometer is provided with means for chopping the infrared radiation received thereby.

6. An apparatus according to claim 3 in which the radiometer is provided with means for chopping the infrared radiation received thereby.

7. An apparatus for detecting defects in welds appearing at the surface of welded material which exhibits differences in emissivity in the surface containing the defect, which comprises (a) a carriage adapted to be moved over the surface of the material tested along the weld;
   (b) an infrared radiometer provided with an amplifying circuit containing a differentiating circuit in its input, said radiometer having means for focusing its field of view onto the plane of the material to be tested, and
   (c) means for irradiating the surface containing the weld with substantially uniform infrared radiation of sufficient intensity to be largely in excess of any radiation in the infrared from self-emission of the material, whereby as the carriage is moved over the material along the weld, defects appearing therein will produce changes of emissivity sufficiently short in time constant so that the differentiating circuit of the radiometer amplifier responds thereto, but slow changes in infrared radiation from the surface are not amplified.

8. An apparatus according to claim 7 including means for chopping the infrared beam receives by the radiometer.

9. An apparatus according to claim 7 in which the means for irradiating the surface being tested with infrared radiation comprise an infrared radiating source rigidly connected to the radiometer and carriage, and moving therewith, said infrared source being oriented to illuminate at least the portion of the weld on which the field of view of the radiometer is focused as the carriage is moved along the weld.

10. A process of detecting flaws and inhomogeneities in the surface of a material in which such flaws and inhomogeneities have emissivity differing from that of the rest of the surface of the material, comprising, in combination,
  (a) detecting infrared radiation in successive small areas over the surface of the material to be tested sequentially in a scan pattern,
  (b) illuminating the surface of the material with infrared radiation sufficiently intense so that the detected infrared radiation reflected by the material is sufficiently high to be substantially unaffected by self-radiation from the material,
  (c) transforming the detected radiation into electrical signals, amplifying the signals in an amplifier having a differentiating circuit in its input, whereby amplifier outputs represent only the presence of defects and no output is produced by slow changes in infrared radiance of the material.

11. A process according to claim 10 is which the material is selected from the group consisting of titanium and copper and alloys thereof.

12. A process according to claim 11 in which the material to be tested is irradiated with infrared radiation of much greater intensity than infrared radiation self-emitted by the material.

13. A process according to claim 10 in which the infrared radiation is chopped.

14. A process according to claim 10 in which the material is a welded sheet and the scan is along the weld.

15. A process according to claim 11 in which the material is a welded sheet and the scan is along the weld.

References Cited

UNITED STATES PATENTS

| | | |
|---|---|---|
| 2,922,887 | 1/1960 | Jacobs. |
| 3,069,893 | 12/1962 | Kerstetter. |
| 3,161,771 | 12/1964 | Engborg et al. |
| 2,901,630 | 8/1959 | Vossberg _____ 250—83.30 |
| 3,206,603 | 9/1965 | Mauro. |
| 3,228,282 | 1/1966 | Barker. |

RALPH G. NILSON, Primary Examiner

D. L. WILLIS, Assistant Examiner

U.S. Cl. X.R.

73—355